INVENTOR.
George J. Engelhard
BY
R. F. Barnard
ATTORNEY

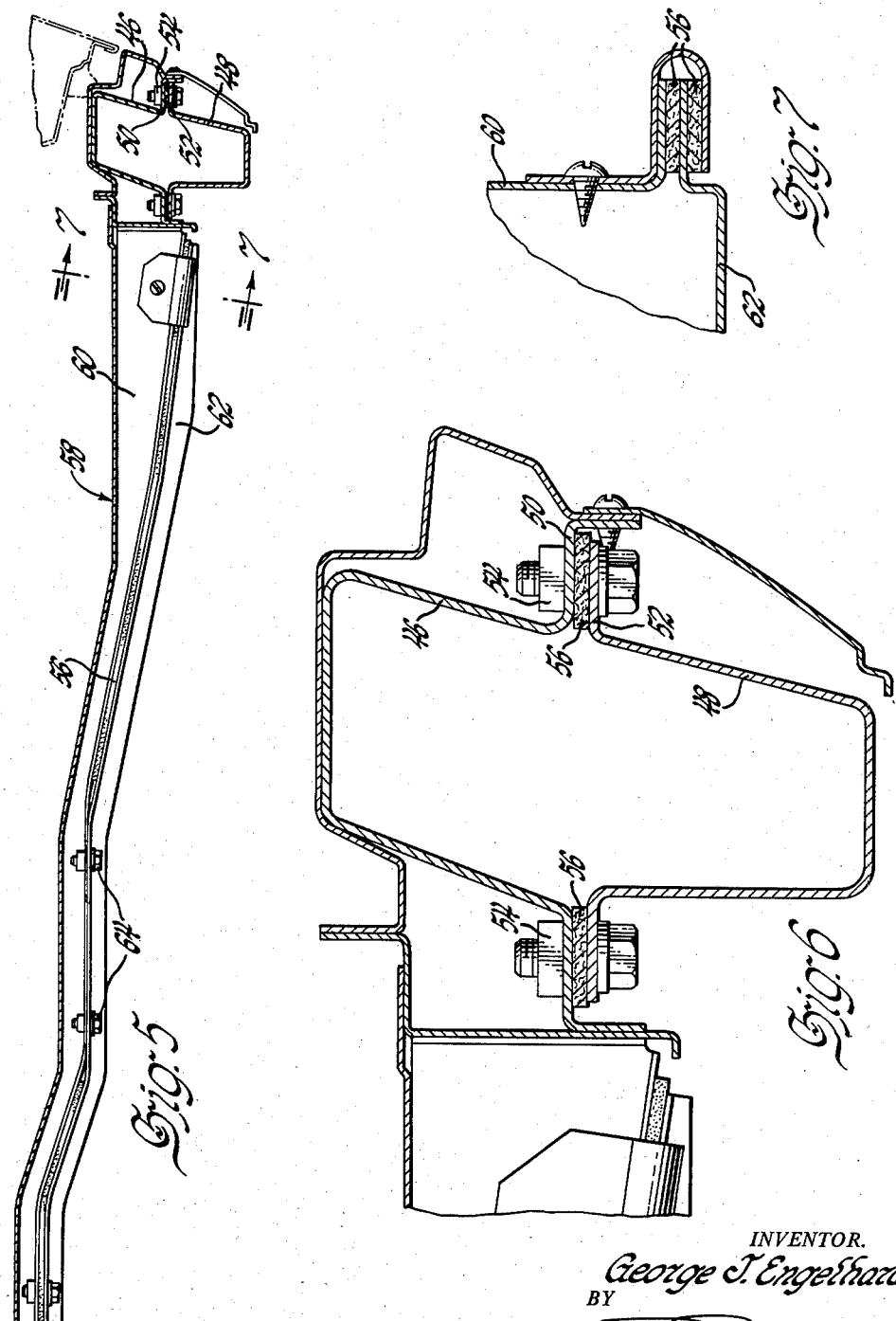

United States Patent Office 2,965,414
Patented Dec. 20, 1960

2,965,414

VIBRATION DAMPENING VEHICLE FRAME CONSTRUCTION

George J. Engelhard, Bloomfield Hills, Mich., assignor to General Motors Corporation, Detroit, Mich., a corporation of Delaware Filed Nov. 28, 1958, Ser. No. 776,925

5 Claims. (Cl. 296—35)

The present invention relates to an improved type vehicle frame construction in which vibrations or excitations created due to flexing of a vehicle frame member are absorbed or dampened in such a way as to prevent their transmission to vehicle passengers thereby increasing the latter's comfort.

The subject body frame structure is constructed in such a way that energy disseminated by high frequency structural excitation is substantially absorbed before it can reach the passenger compartment. Noise, shake and harshness are the effects noticeable to the car occupant due to unabsorbed energy which is generated during the flexing of the frame structure. By absorbing this energy before it reaches the occupant the latter's comfort is immeasurably improved. In general, this is a well recognized desideratum and is achieved to varying extends by the vehicle tires, suspension, engine mounts, shock absorbers, rubber body mounts and body panel deadener materials. These vibration absorbing devices have considerably improved passenger comfort.

There has, however, remained a rather significant source of discomfort-producing vibrations not alleviated by previously known types of vibration absorbing devices. This source is the vehicle frame itself. In the present invention a vibration dampening material is introduced within the body frame structure in such a way as to absorb a substantial part of the high frequency structural vibrations induced therein by the flexing of the frame.

More specifically the present invention is illustrated with a fabricated or built-up rocker-frame construction which includes a pair of hat-shaped sections one inverted above the other and including adjacently disposed flange surfaces through which the sections are joined. In the present invention a suitable vibration dampening material is interposed between the flange section flanges. In this way, and for reasons which will be subsequently considered in greater detail, a considerable portion of the excitation induced due to flexing of the frame member is absorbed by the dampening material thereby preventing the transmission of such vibrations in any form to the vehicle occupants.

The details as well as other objects and advantages of the present invention will be apparent from a perusal of the detailed description which follows.

In the drawings:

Figure 5 is a modified form of frame member embodying the subject invention;

Figure 6 is an enlargement of the rear end of the frame of Figure 5; and

Figure 7 is a view along line 7—7 of Figure 5.

Figure 4:
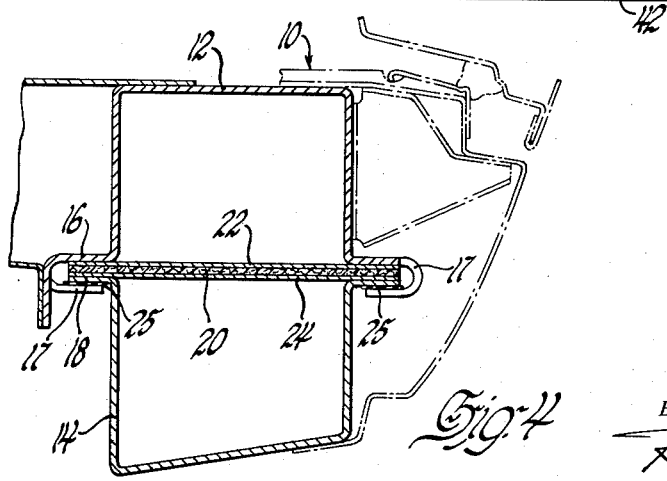
Figure 4 is a view along line 4—4 of Figure 1.

Referring first to the modification of Figures 1 through 4, an integral body-frame structure is shown generally at 10. Frame structure 10 comprises two individually boxed-in hat shaped sections 12 and 14 with section 12 inverted directly over section 14 so that respective flanges 16 and 18 face each other as best seen in Figure 4. Upper section or body sill 12 has longer flanges than those on lower or frame section 14. Still flanges 16 include tabs 17 of sufficient length to permit the latter to be periodically clinched around frame flanges 18 to secure sections 12 and 14 together to form an integral box frame.

With this type of fabricated box frame construction considerable vibration or excitation takes place due to the flexing of the respective sections as the vehicle body moves up and down. This excitation or vibration is due to the flexure of the sections 12 and 14. To illustrate, as each of the sections 12 and 14 flexes individually in one direction, e.g. downwardly, the bottom surface of the upper or body sill section 12 goes into tension and elongates, while the top surface of the lower or frame section 14 goes into compression shortens. In the past, this mechanical movement of the frame sections relative to each other has induced vibrations which in one form or another has diminished passenger comfort.

In the present invention a vibration dampening material 20, such as asphalt saturated deadener felt, is placed between frame sections 12 and 14 and more specifically between flanges 16 and 18 extending respectively from the open faces of the sections. Thus, referring to the illustrated downward deflection of the frame sections, supra, as the bottom surface of the sill section elongates and the upper or top surface of the frame section shortens, the energy created thereby is dissipated in the shearing forces imposed on dampening material 20. Accordingly, the energy which heretofore has set up vibrations in the frame sections is absorbed in a relatively vibrationless material.

The greatest amount of energy absorption occurs when both sections 12 and 14 elongate and compress an equal amount. Thus, dampening material 20 should be located approximately on the neutral horizontal axis of the combined rocker-frame section 10.

Referring to the cross sectional view of Figure 4, it will be seen that dampening material 20 is actually sandwiched between sill and frame plates 22 and 24.

Figure 1:
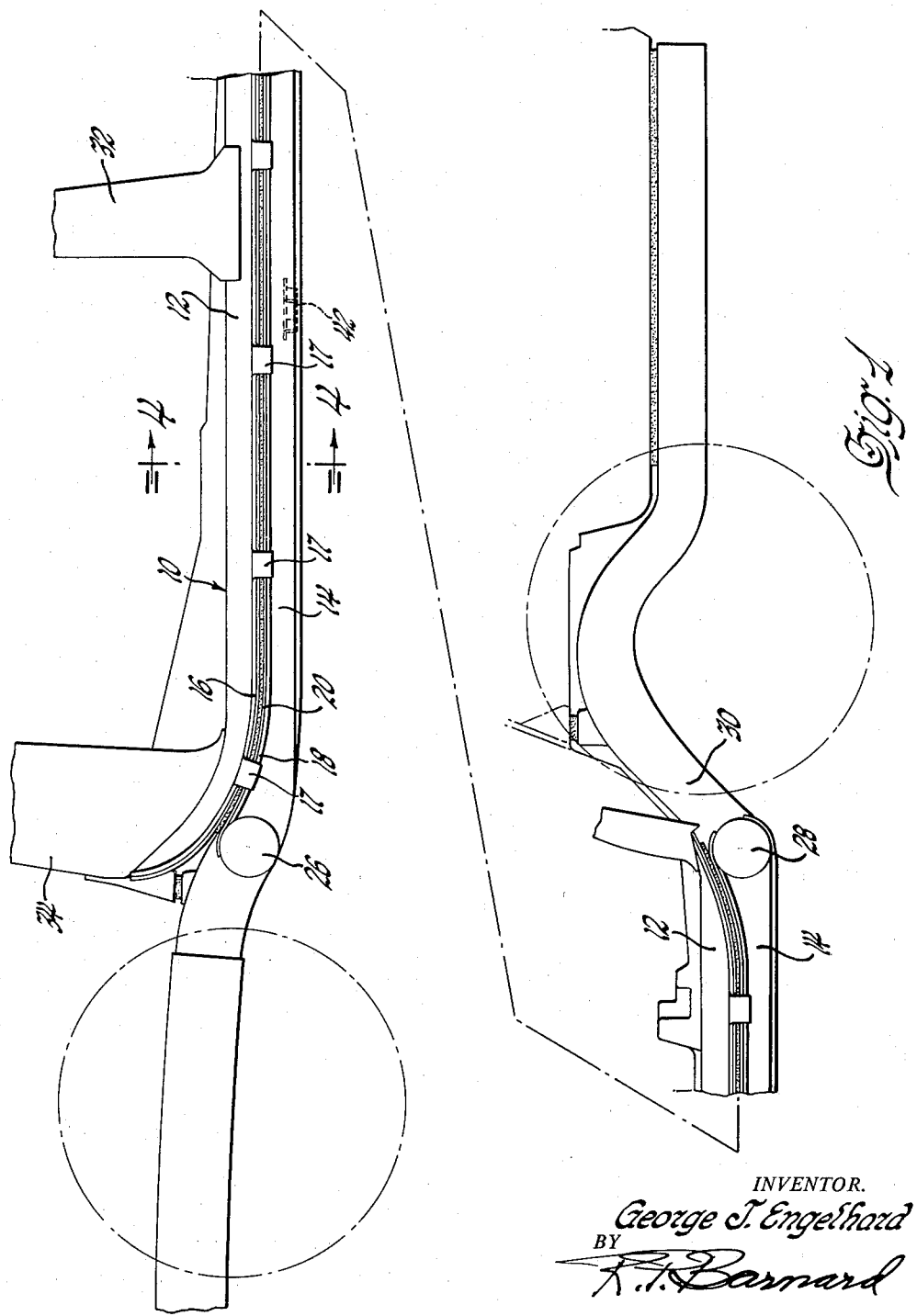
Figure 1 illustrates one form of frame construction embodying the subject invention.
Figure 2:
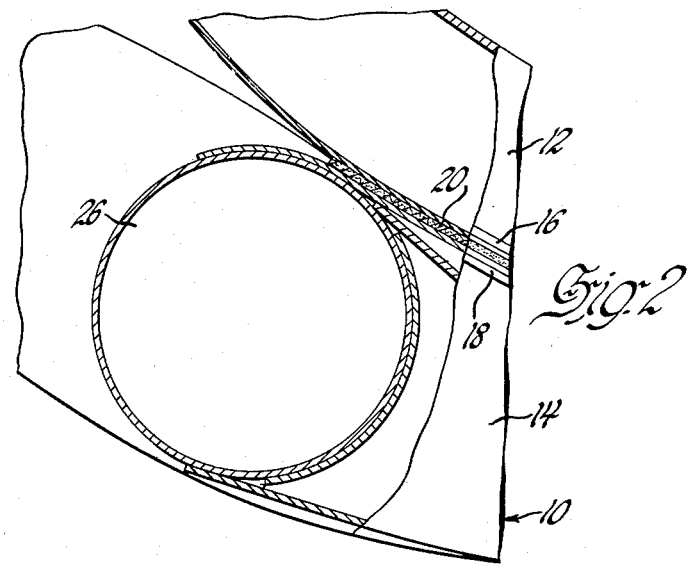
Figure 2 is a partially sectioned enlargement of the front end of the frame member of Figure 1.
Figure 3:
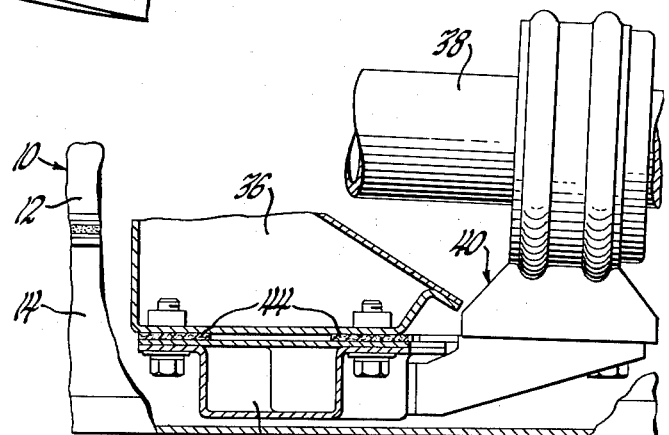
Figure 3 is a partially sectioned enlargement showing the frame cross bar construction.

Referring briefly now to the general construction of integral body-frame 10, it will be seen, in referring to Figure 1, that at both ends of the structure frame section 14 deepens and the sill section 12 reduces in depth. The widened frame thus provides a sufficiently wide surframe to permit lateral frame tubes 26 and 28 to be welded at both ends of this portion of the frame. Tubes 26 and 28 provide lateral rigidity to the frame structure. The front lateral tube 26 passes under the toe pan. The rear lateral tube 28 is disposed proximate the front of the wheel house portion 30 of the frame.

A center or door pillar 32 is suitably fixed to the body-frame 10 as is a front pillar 34.

A body cross bar member 36 extends across the underbody and supports a propeller shaft 38 in a bearing member indicated generally at 40. Bearing support member 40 includes a reinforcing member 42 bolted to cross bar 36 under propeller shaft 38. Reinforcement member 42 is mounted to cross bar 36 through vibration dampening material 44 the same as the material 20 used between frame sections 12 and 14.

The frame illustrated in Figures 5 through 7 is of a conventional and non-integral body design and includes side frames or rails having an upper or sill section 46 and a lower or frame section 48 suitably connected together at their respective flanges 50 and 52 by bolts 54.

In this modification, vibration dampening material 56 is again disposed between the frame section flanges 50 and 52. Fabricated cross frame members indicated generally at 58 are provided and include upper and lower sections 60 and 62 secured together through bolts 64 and intermediate which sections dampening material 56 is also disposed.

The functioning of the dampening material is the same in both frame modifications and serves to absorb vibrations otherwise created by the flexure of the frame components.

Referring again to Figure 4, to insure that attaching tabs 17 do not serve as noise and vibration carriers between sections 12 and 14, additional strips or pieces 25 of dampening material are placed between the bent over portions of tabs 17 and the underside of frame flanges 18.

I claim:

1. A vehicle frame construction comprising a first longitudinally extending U-shaped frame section, said section including an open face and flanges formed proximate said open face, a second longitudinally extending U-shaped frame section including an open face and flanges disposed proximate said open face, said second frame section being inverted relative to the first section and disposed over said first section to form a box-like frame, a continuous sheet of non-metallic vibration dampening material disposed between and extending substantially throughout the length of the flanges of the respective frame sections, and means clamping said sections together whereby said sections support said material therebetween.

2. A vehicle body-frame construction comprising a first longitudinally extending U-shaped frame section, said section including an open face and flanges formed proximate said open face, a second longitudinally extending U-shaped frame section including an open face and flanges disposed proximate said open face, said second frame section being inverted relative to the first section and disposed over said first section to form a box-like frame, a continuous sheet of felt-like material disposed between and extending substantially throughout the length of the flanges of the respective frame sections, and means clamping said sections together whereby said sections support said felt-like material therebetween, said frame sections and said material being so arranged that energy created by frame deflection is absorbed by said material.

3. A vehicle body-frame construction comprising a first longitudinally extending U-shaped frame section, said section including an open face and flanges formed proximate said open face, a second longitudinally extending U-shaped frame section including an open face and flanges disposed proximate said open face, said second frame section being inverted relative to the first section and disposed over said first section to form a box-like frame, a continuous sheet of non-metallic vibration dampening material disposed between and extending substantially throughout the length of the flanges of the respective frame sections, and means clamping said sections together whereby said sections support said material therebetween, deflection of said frame placing the flange surfaces of one section in tension and the flange surfaces of the other surface in compression whereby there is a tendency of one of said surfaces to be elongated and the other compressed, the energy forces of said elongation and compression being absorbed by said material.

4. A vehicle body-frame construction comprising a first longitudinally extending U-shaped frame section, said section including an open face and outwardly extending flanges formed proximate said open face, a second longitudinally extending U-shaped sill section including an open face and outwardly extending flanges disposed proximate said open face, said sill section being inverted relative to the frame section to form a box-like beam, a continuous sheet of non-metallic vibration dampening material disposed between the frame and sill flanges, said material extending longitudinally throughout the length of said flanges, and means clamping said sections together whereby said sections support said material therebetween.

5. A vehicle body-frame construction as set forth in claim 4 in which the sill flanges extend outwardly beyond the frame flanges to an extent permitting the former to be wrapped around the latter and thereby constituting the means for clamping the sections together.

References Cited in the file of this patent

UNITED STATES PATENTS

| | | |
|---|---|---|
| 1,527,268 | Nolan | Feb. 24, 1925 |
| 1,738,670 | Rohrbach | Dec. 10, 1929 |
| 1,933,359 | Acher | Oct. 31, 1933 |
| 2,613,986 | Heyl | Oct. 14, 1952 |

FOREIGN PATENTS

| | | |
|---|---|---|
| 664,915 | Great Britain | Jan. 16, 1952 |

UNITED STATES PATENT OFFICE
CERTIFICATION OF CORRECTION

Patent No. 2,965,414 December 20, 1960

George J. Engelhard

It is hereby certified that error appears in the above numbered patent requiring correction and that the said Letters Patent should read as corrected below.

Column 2, line 52, for "frame" read -- face --.

Signed and sealed this 30th day of May 1961.

(SEAL)
Attest:

ERNEST W. SWIDER
Attesting Officer

DAVID L. LADD
Commissioner of Patents